United States Patent [19]

Hagimori

[11] Patent Number: 5,528,255
[45] Date of Patent: Jun. 18, 1996

[54] DISPLAY CONTROL DEVICE FOR LEVEL METER

[75] Inventor: Haruo Hagimori, Kyoto, Japan

[73] Assignee: Rohm Co., Ltd., Kyoto, Japan

[21] Appl. No.: 981,008

[22] Filed: Nov. 24, 1992

[30] Foreign Application Priority Data

Dec. 6, 1991 [JP] Japan .................................. 3-322990

[51] Int. Cl.$^6$ ...................................................... G01D 7/00
[52] U.S. Cl. ................................................ 345/35; 381/56
[58] Field of Search ........................... 340/815.11, 752, 340/753, 754, 722; 381/98, 56; 345/140, 158, 35, 36, 37, 38, 39; 84/464 R, 464 A; 455/157.2, 159.1, 177.1, 200.1, 344

[56] References Cited

U.S. PATENT DOCUMENTS

| | | | |
|---|---|---|---|
| 4,185,276 | 1/1980 | Benson | 340/815.11 |
| 4,301,512 | 11/1981 | Keith et al. | 340/753 |
| 4,424,538 | 1/1984 | Greene | 360/68 |
| 4,534,057 | 8/1985 | Miyata et al. | 340/815.11 |
| 4,577,188 | 3/1986 | Inami | 345/140 |
| 4,613,967 | 9/1986 | Hamada et al. | 369/221 |
| 4,637,047 | 1/1987 | Haino | 340/753 |
| 4,679,042 | 7/1987 | Trethewey | 340/815.11 |
| 4,745,402 | 5/1988 | Auerbach | 340/709 |
| 4,754,268 | 6/1988 | Mori | 345/158 |
| 4,763,067 | 8/1988 | Fladstol | 340/754 |
| 4,785,475 | 11/1988 | Rimkeit et al. | 381/98 |
| 4,922,239 | 5/1990 | Kugo et al. | 340/753 |
| 5,045,841 | 9/1991 | Shrock | 340/752 |
| 5,119,426 | 6/1992 | Roberts | 340/815.11 |
| 5,138,665 | 8/1992 | Ito | 381/98 |
| 5,204,969 | 4/1993 | Capps et al. | 381/48 |

OTHER PUBLICATIONS

Vernon Boyd, "LED bar–segment array forms low–cost scope display" Engineer's notebook *Electronics*, (Nov. 1977), pp. 128–130.
Sony Audio "Eye Fidelity", *Stereo Review* (Jun. 1979).
Quentin Rice, "Solid–State Level Indication", *Wireless World* (Aug. 1980) pp. 31–33, vol. 4, No. 1535.
"Dot/Bar–Graph Display Driver", Michael X. Maida, *IC Applications*, vol. 51, No. 10 (Oct. 1980) pp. 96–100 an 104.

*Primary Examiner*—Richard Hjerpe
*Assistant Examiner*—Kara Farnandez Stoll
*Attorney, Agent, or Firm*—Loeb & Loeb

[57] ABSTRACT

A display control device for a level meter, including a BPF for performing a band-pass filtering of an audio signal to obtain a plurality of frequency components. The BPF obtains an average level of each frequency component of the audio signal. A variable resistor divides a power source voltage. An A/D converter converts the frequency components of the audio signal, the average level and the divided voltage into digital signals. A display controller displays the levels of the frequency components and the average levels thereof on an LCD. The display controller holds a peak value of one of the frequency components or the average levels thereof, and the peak hold time is determined on the basis of the divided voltage. The peak hold time can be freely changed depending on tastes and uses of users.

15 Claims, 5 Drawing Sheets

DISPLAY CONTROL DEVICE FOR LEVEL METER

BACKGROUND OF THE INVENTION i) Field of the Invention:

The present invention relates to a level meter used for audio systems or the like and a display control device for use in display control of the level meter.

ii) Description of the Related Arts:

Conventionally, a level meter composed of an LED (light emitting diode) array, a liquid crystal or the like is used in audio systems, such as a CD (compact disc), or a DAT (digital audio tape), video systems such as a TV, or a VTR (video tape recorder), or a tachometer of an automobile or the like. In the level meter of this kind, a so-called peak hold display is performed.

The peak hold display functions, for example, not only to display a level of an audio signal but also to hold its peak value for a predetermined time and to display the peak value at the same time. In a level meter of an audio system, as shown in FIG. 4, there are a plurality of frequency component displays (spectrum analyzer displays) 10-1 to 10-6 of 50 Hz, 100 Hz, 330 Hz, 1 kHz, 3.3 kHz and 10 kHz bands and one level display 10-7 of the audio signal. In this case, a peak hold display 10-8 is executed in the level display 10-7. Of course, the peak hold display can be carried out in the spectrum analyzer displays 10-1 to 10-6.

In FIG. 5, there is shown a display control device, as disclosed in Applicant's copending Japanese Patent Application No. Hei 3-160356. In this case, an analog audio signal is input to a display control IC 12 via a BPF (band-pass filter) 14. The BPF 14 performs band-pass filtering of the audio signal to output analog frequency components f1 to f6 for the spectrum analyzer displays. The BPF 14 also outputs a signal LEV representing an average level of the frequency components f1 to f6.

The display control IC 12 includes two A/D converters 16 and 18, a display controller 20 and a memory 22. The A/D converter 16 converts the output signals of the BPF 14 into digital audio signals. The digital audio signals output from the A/D converter 16 are input to the display controller 20, and a level and spectrum analyzer display and a peak hold display are executed in an LCD 24 as a display means, as shown in FIG. 4.

The memory 22 is used for storing a recovery time input to the display controller 20 via the A/D converter 18, and the like. That is, in order to readily see the display on the LCD 24, the memory 22 is used for performing a recovery control for showing the variation of the actual audio signals as a gentle variation with a predetermined time constant. The recovery time represents the time constant in the recovery control.

However, in the above-described conventional display control device, the time for holding the peak value is fixed and thus a setup change of the time depending on the tastes and functions of users can not be carried out. Hence, the same peak hold time must be accepted when listening to, for example, a rock and roll number and a popular ballad number and the user's satisfaction is impaired.

SUMMARY OF THE INVENTION

It is therefore an object of the present invention to provide a display control device for a level meter in view of the aforementioned problems, which is capable of changing a peak hold time in a proper and ready manner depending on tastes and functions of users.

In accordance with one aspect of the present invention, there is provided a display control device for a level meter, comprising:

(a) level input means for inputting signals for representing audio levels;

(b) level display control means for displaying the audio levels in the level meter on the basis of the input signals;

(c) peak display control means for displaying an audio peak value in the level meter to hold the audio peak value for a predetermined peak hold time; and (d) setup means for changing the peak hold time.

Therefore, according to the present invention, the peak hold time can be freely changed. A user can freely set up the peak hold time depending on, for example, his own tastes and function of the device. As a result, applicability can be improved.

Further, a level meter of the present invention, includes:

(a) display means such as an LCD or the like for displaying audio levels;

(b) level input means for inputting signals for representing the audio levels;

(c) level display control means for displaying the audio levels on display means on the basis of the input signals;

(d) peak display control means for displaying an audio peak value on the display means to hold the audio peak value for a predetermined peak hold time; and (e) setup means for changing the peak hold time.

In this construction of the level meter, the same advantages as those of the above-described display control device can be obtained.

According to the present invention, the setup means for changing the peak hold time can be constituted by either of the following two constructions.

The first construction includes:

(e1) voltage dividing means for dividing a predetermined DC voltage; and (e2) ratio changing means for changing a dividing ratio for obtaining a predetermined divided voltage from the voltage dividing means.

In this case, the peak hold time is changed depending on the divided voltage obtained from the voltage dividing means. The setup means of this construction can be implemented by a simple structure.

The second construction includes:

(e1) means for inputting the peak hold time; and (e2) means for storing the peak hold time.

In this case, the peak hold time is changed on the basis of content stored in the peak hold time storing means. The peak hold time inputting means, for example, can be implemented by an input port for inputting a digital signal representing the peak hold time from an external device or means for inputting a radio signal representing the peak hold time from an external device. By using either means, the content in the storing means can be rewritten. Further, the setup means of such a structure can be constituted by a simple structure.

Further, when the radio signal input from the external device is a light signal such as a signal generated by a normal remote controller, the radio signal inputting means includes a light detector element for converting the light signal into an electric signal and means for amplifying the electric signal.

As described above, in the second construction, the adjustment of the voltage dividing ratio, required in the first construction is not required, and thus it is readily understood that a user having no professional knowledge can readily change the setup of the peak hold time by using an external device such as the normal remote controller. Further, since this external device can be composed of a part of the remote controller of an audio system or a video system using the level meter of the present invention, it is readily understood that the control of the audio system or the video system and the peak hold time setup can be linked with each other.

The level input means can be constituted by using a BPF and an A/D converter. The BPF is means for picking up frequency components to be displayed in a level meter by band-pass filtering of the audio signal, and the A/D converter is means for converting the analog audio signals into digital audio signals.

The number of pass bands of the BPF can be one or plural. In case of a plurality of pass bands, by using a level meter capable of displaying a plurality of frequency components, the so-called spectrum analyzer display can also be performed. Also, by giving an average level calculation means to the BPF, the average level display can be carried out. Further, the peak value display can be executed in any of the frequency components of the spectrum analyzer display or the average levels.

The input to the A/D converter is not restricted to the audio signal. For example, the divided voltage obtained in the voltage dividing means can be input to the A/D converter, and the peak display control means can take in the divided voltage as the digital signal. Of course, both the audio signals and the divided voltage can be input to the A/D converter. In this case, certain bits of the digital signal are allocated to the audio signals and the other bit of the same is allocated to the divided voltage.

Further, the display control device according to the present invention can be provided with a recovery control means. In this case, means for storing both the peak hold time and a recovery time can be used as memory means.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 1:
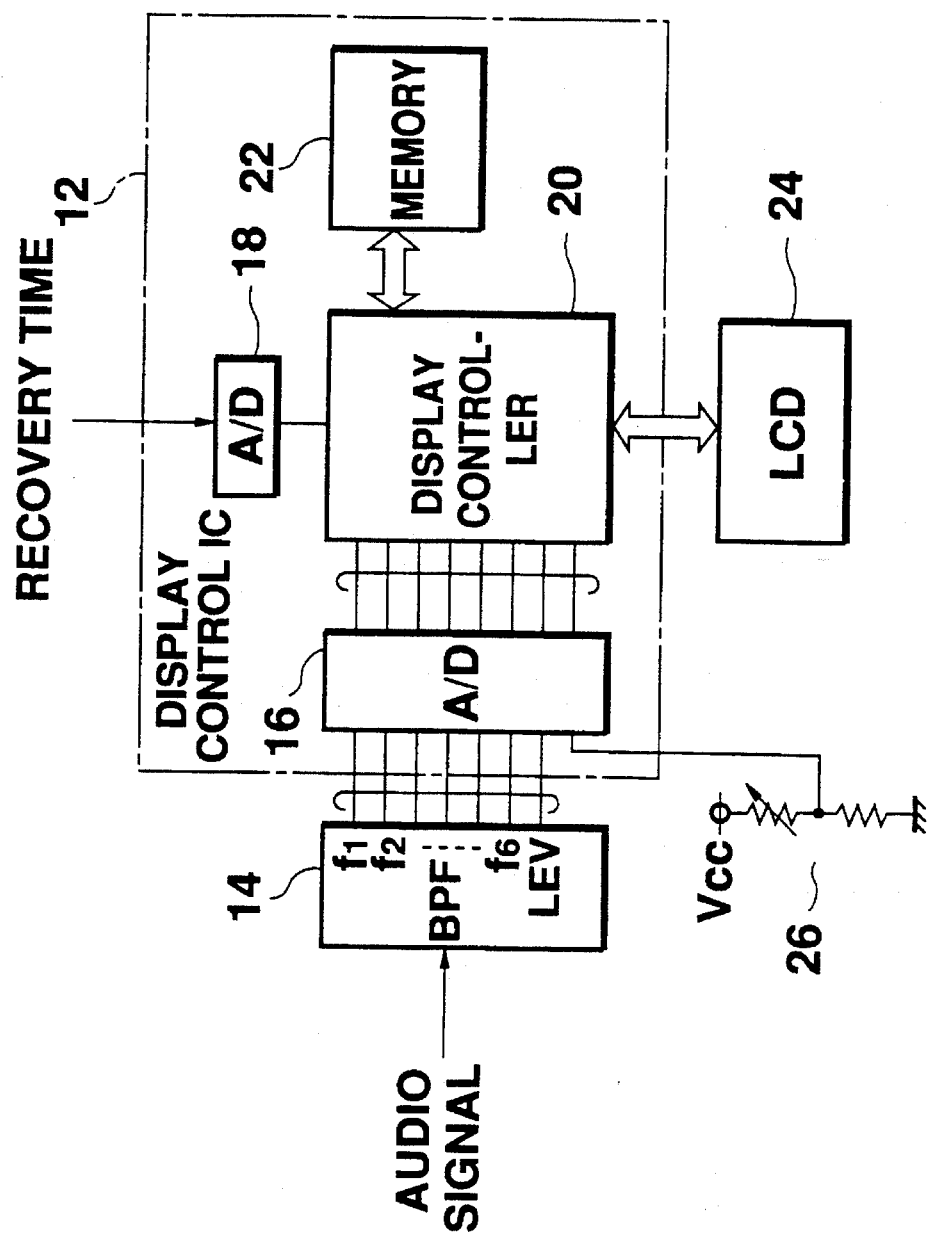
FIG. 1 is a block diagram of a first embodiment of a display control device according to the present invention.
Figure 4:
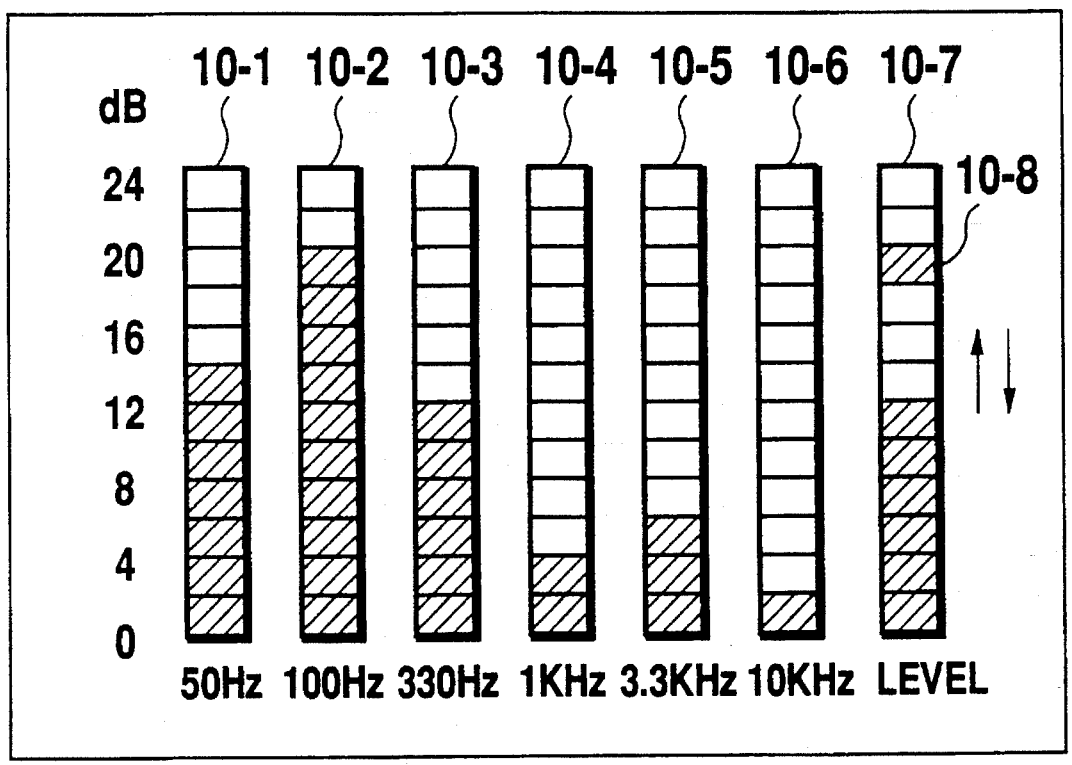
FIG. 4 is a schematic view showing a conventional level meter including a peak hold display.
Figure 5:
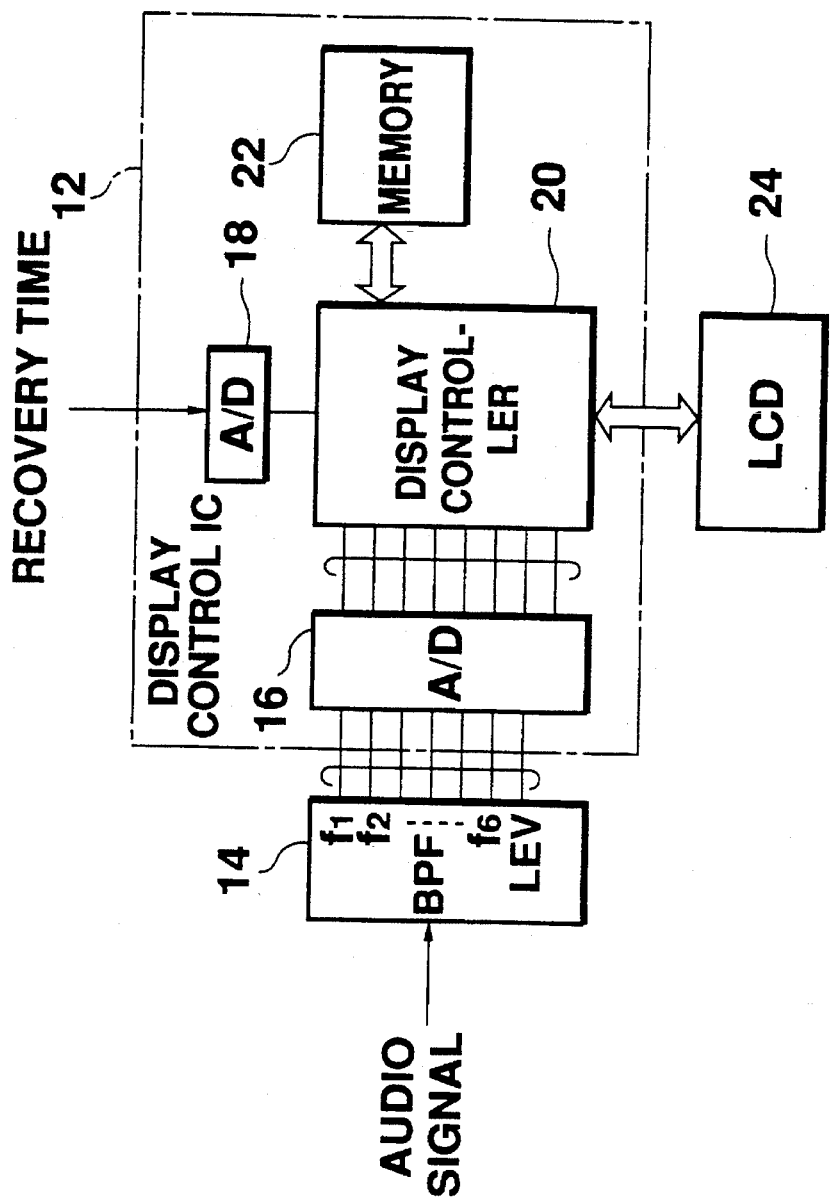
FIG. 5 is a block diagram of a conventional display control device disclosed in Applicant's copending Japanese Application.

The present invention will now be described in connection with its preferred embodiments with reference to the accompanying drawings, wherein the same parts as those described above in connection with the conventional display control device shown in FIGS. 4 and 5 are designated by the same reference characters and thus the repeated description thereof can be omitted for brevity. In FIG. 1, there is shown the first embodiment of a display control device for a level meter according to the present invention.

In FIG. 1, the display control device includes a display control IC 12 having two A/D converters 16 and 18, a display controller 20 and a memory 22, a BPF 14 and an LCD 24 and further includes a variable resistor 26. This variable resistor 26 is an external component and divides a power source voltage Vcc at a variable setup dividing ratio to output a divided voltage to the A/D converter 16. The A/D converter 16 converts the divided voltage output of the variable resistor 26 along with the analog audio signals fed from the BPF 14 into the digital divided voltage value and the digital audio signals and outputs the digital values to the display controller 20. The display controller 20 executes a peak hold display of the input divided voltage value as a peak hold time along with spectrum analyzer displays of the audio signals on the LCD 24. In this embodiment, the variable resistor 26 can be constituted by a combination of fixed resistors. In such a case, by pushing a button, the resistance of the variable resistor 26 can be discretely varied by a user.

Figure 2:
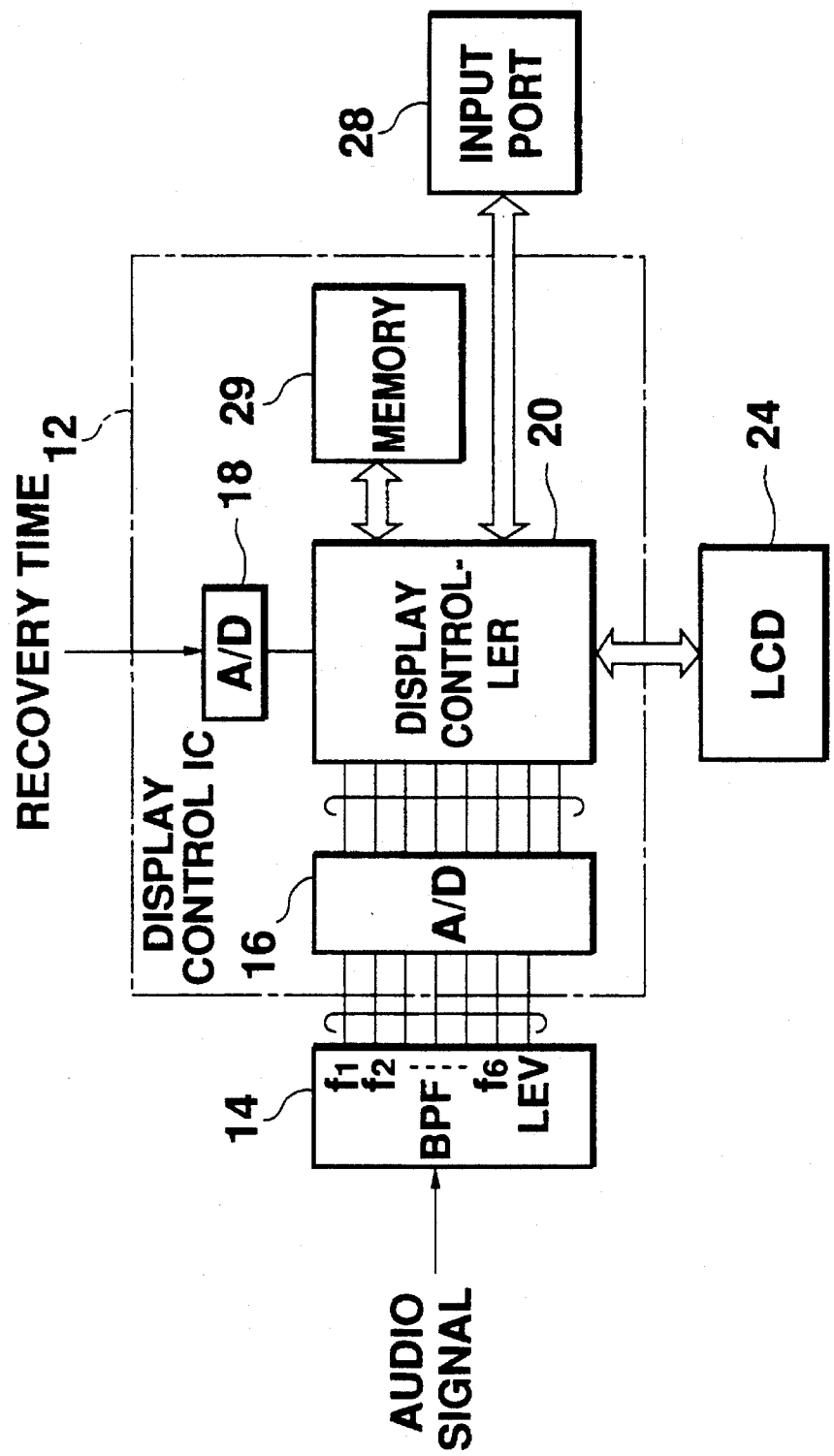
FIG. 2 is a block diagram of a second embodiment of a display control device according to the present invention.

In FIG. 2, there is shown the second embodiment of a display control device for a level meter according to the present invention, having the same construction as the first embodiment shown in FIG. 1, except for an input port 28 for inputting a peak hold time as a digital value to the display controller 20 by a manual operation or from an external device in place of the variable resistor 26. In this embodiment, the peak hold time input to the display controller 20 via the input port 28 is used for the control of the peak hold display on the LCD 24 by the display controller 20 and is stored in a memory 29. Hence, by inputting another peak hold time to the display controller 20 via the input port 28, the content in the memory 29 can be rewritten, and thus the setup of the peak hold time on the LCD 24 can be freely changed. The memory 29 can be composed of an external memory. The memory 29 can also store the recovery time. Further, by inputting the peak hold time to the display controller 20 from an external device such as a remote controller, the display control device can be used in combination with another device or circuit such as a reproduction controller of the CD or the like.

Figure 3:
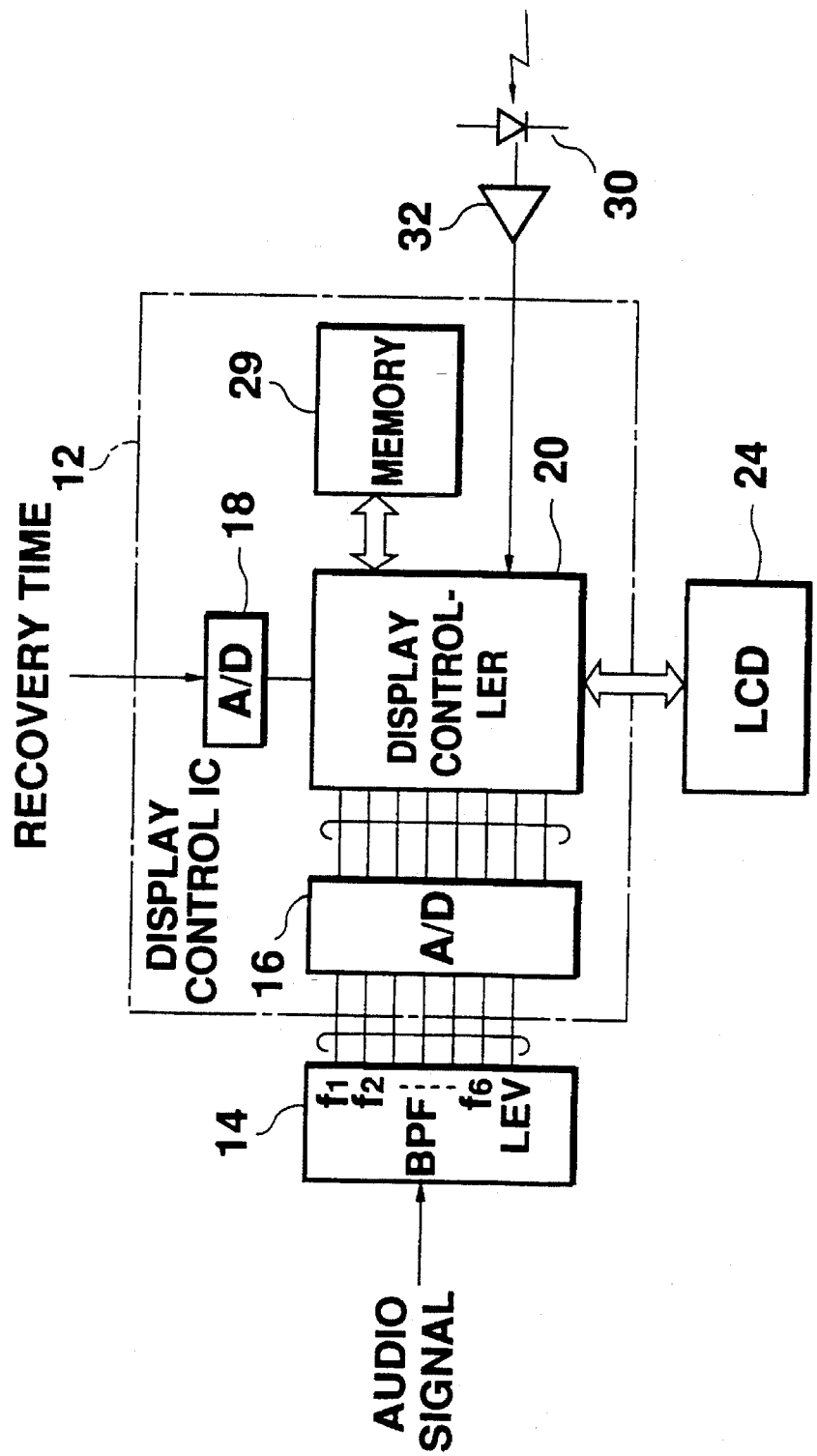
FIG. 3 is a block diagram of a third embodiment of a display control device according to the present invention.

In FIG. 3, there is shown the third embodiment of a display control device for a level meter according to the present invention, having the same construction as the second embodiment shown in FIG. 2 except for a light detector element 30 and a preamplifier 32 in place of the input port 28. In this embodiment, the light detector element 30 takes in a light signal from the remote controller and converts the light signal into an electric signal to output it to the preamplifier 32. The preamplifier 32 amplifies the input electric signal and outputs the amplified electric signal to the display controller 20. The display controller 20 handles the output of the preamplifier 32 as the peak hold time, and not only uses the received signal for the control of the peak hold display on the LCD 24 but also rewrites the content in the memory 29. Hence, in this embodiment, the setup of the peak hold time can be changed by inputting the signal from the remote controller, and as a result, the applicability can be improved. In this embodiment, in addition to the light remote controller, an ultrasonic remote controller can be used.

As described above, according to the present invention, the setup of the peak hold time can be freely changed, and thus the more suitable peak hold display on the LCD can be performed depending on tastes such as kinds of music of the users and uses of the systems such as an audio system, a video system and an automobile. Further, according to the present invention, the functions such as the recovery control of the conventional display control device can also be realized. The display arrangement shown in FIG. 4 is preferably used in the present device but is not restricted to this case.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A display control device for a level meter, comprising:

level input means for inputting signals for representing audio levels;

level display control means for displaying the audio levels in the level meter on the basis of the input signals, wherein said level display control means is connected to said level input means;

peak display control means for displaying an audio peak value in the level meter, in addition to the audio levels displayed by said level display control means, by holding the audio peak value for a predetermined peak hold time, said peak display control means including an input for receiving a control signal representative of the peak hold time;

setup means including means for inputting the peak hold time, means for storing the peak hold time and an operator controllable element for controlling the peak hold time wherein the peak hold time is changed on the basis of content stored in the peak hold time storing means and is varied only by the setup means and independent of variances in the amplitude of the signals input by the level input means and said setup means further including an output connected to the input of the peak display control means for providing the control signal to the peak display control means;

means for inputting a recovery time; and recovery control means for making variations of the audio levels to be displayed in the level meter to be gentle variations against actual variations of the levels of the audio signals, the peak hold time storing means storing the input recovery time.

2. The display control device of claim 1, wherein the level input means includes conversion means for converting an analog audio signal into a digital audio signal.

3. The display control device of claim 1, wherein the setup means includes:

voltage dividing means for dividing a predetermined DC voltage; and ratio changing means for changing a voltage dividing ratio for obtaining a predetermined divided voltage from the voltage dividing means, and wherein the peak hold time is changed depending on the divided voltage obtained from the voltage dividing means.

4. The display control device of claim 3, wherein the level input means includes conversion input means for converting the divided voltage into a digital value and inputting the digital value to the peak display control means.

5. The display control device of claim 3, wherein the level input means includes analog-digital converter means of a predetermined bit number, the analog-digital converter means converting the analog audio signals and the divided voltage obtained in the voltage dividing means into digital signals, the analog-digital converter means outputting first partial bits corresponding to the analog audio signals of the digital signals and second partial bit corresponding to the predetermined divided voltage of the digital signals to the level input means and the peak display control means, respectively.

6. The display control device of claim 1, wherein the level input means includes band-pass filter means for performing a band-pass filtering of the audio signal, the band-pass filter means including pass bands of frequency bands to be displayed in the level meter, the band-pass filter means outputting frequency components obtained by the band-pass filtering as the signals representing the audio levels to the level display control means.

7. The display control device of claim 6, wherein the level meter displays the levels of a plurality of frequency bands, the band-pass filter means including the pass bands of the plurality of frequency bands to be displayed in the level meter, the band-pass filter means outputting the frequency components obtained by the band-pass filtering as the signals representing the audio levels in the pass bands to the level display control means.

8. The display control device of claim 7, wherein the peak display control means includes means for displaying the peak value with respect to one of the input signals in the level meter.

9. The display control device of claim 7, wherein the level input means includes average means for averaging the levels of the audio signals with respect to the frequency to obtain an average value, the average means outputting the average value as a signal representing a frequency average level of the audio signals to the level input means.

10. The display control device of claim 9, wherein the peak display control means includes means for displaying the peak value with respect to one of the input signals in the level meter.

11. The display control device of claim 1, wherein the level input means includes average means for averaging the levels of the audio signals with respect to the frequency to obtain an average value, the average means outputting the average value as a signal representing a frequency average level of the audio signals to the level input means.

12. The display control device of claim 1, wherein the peak hold time inputting means includes an input port for inputting a digital signal representing the peak hold time from an external device.

13. The display control device of claim 1, wherein the peak hold time inputting means includes means for inputting a radio signal representing the peak hold time from an external device.

14. The display control device of claim 13, wherein the radio signal inputting means includes a light detector element for converting a light signal as the radio signal representing the peak hold time into an electric signal.

15. The display control device of claim 14, wherein the radio signal inputting means includes means for amplifying the electric signal obtained in the light detector element.

* * * * *